UNITED STATES PATENT OFFICE 2,311,261

ESTERS OF ENDO-METHYLENE HEXAHYDROPHTHALIC ACIDS WITH HIGHER ALIPHATIC ALCOHOLS

Charles E. Staff, Charleston, W. Va., assignor to Carbide and Carbon Chemicals Corporation, a corporation of New York No Drawing. Application October 18, 1941,
Serial No. 415,633

3 Claims. (Cl. 260—468)

This application is a continuation-in-part of the copending application of C. E. Staff and W. N. Stoops, entitled "Plastic compositions," Serial No. 339,490, filed June 8, 1940. That application is concerned with plastic compositions consisting of vinyl resins intimately combined with diester plasticizers formed by reacting the acidic adducts of hydrocarbons having conjugated double bonds and maleic acid or anhydride, or their derivatives, with a mono-hydroxyl compound of the group consisting of aliphatic acyclic and cyclic alcohols having at least six carbon atoms, glycol monoethers, and polyglycol monoethers. This application is concerned with, as new chemical compounds, diesters of endo-methylene hexahydrophthalic acid with aliphatic acyclic alcohols having at least six carbon atoms.

Endo-methylene hexahydrophthalic acid may be obtained by the hydrogenation of the endo-methylene tetrahydrophthalic acid which is formed by the addition of cyclopentadiene and maleic anhydride as described in Diels and Alder Patent No. 1,944,731. The saturated esters may also be formed by hydrogenation of the diesters of endo-methylene tetrahydrophthalic acid with aliphatic acyclic alcohols having at least six carbon atoms. Typical higher aliphatic alcohols which may be employed in forming the new esters are hexanol, 2-ethyl butanol, methyl isobutyl carbinol, methyl amyl carbinol, 2-propyl butanol, octanol, 2-ethyl hexanol, lauryl alcohol, undecanol, and stearyl alcohol.

Esterification of the aforesaid endo-methylene hydrophthalic acids with the foregoing group of higher aliphatic alcohols may be carried out at temperatures ranging from 50° C. to 300° C. and, if desired, in the presence of suitable catalysts, such as sulfuric acid. The water formed during esterification may be removed continuously as an azeotropic mixture by distillation with benzene, xylene, or toluene.

The new esters are valuable for various industrial uses. Thus, they may be used as softeners or modifiers in various waxes and polishes, as softening agents for leather, and as high boiling solvents, lubricants, textile assistants, and penetrants, but they are particularly suited as plasticizers for vinyl resins.

Vinyl resins from which plastic compositions may be derived by combination with the new esters are those which may be formed by the polymerization or condensation of vinyl compounds, such as vinyl acetate, vinyl propionate, vinyl butyrate, vinyl chloride, vinyl bromide, or vinyl benzene (styrene). Polyvinyl acetal resins, which may be formed by the partial or complete reaction of aldehydes with polyvinyl alcohol or incompletely hydrolyzed polyvinyl esters, are also included within the group of vinyl resins. A particularly desirable type of vinyl resin for use in the plastic composition is that which may be formed by the conjoint polymerization of vinyl halides with vinyl esters of aliphatic acids.

The plastic compositions are valuable for various applications and, depending on the use involved, the selection of vinyl resins with special characteristics is indicated. If the plastic composition is intended for use in lacquers from which it is deposited, upon drying or baking, as a protective, ornamental or electrically insulating coating in the form of a flexible and tough film, the following vinyl resins are preferred:

a. Polyvinyl acetal resins formed by the condensation of aldehydes with polyvinyl alcohol.
b. Conjoint polymers of vinyl chloride with vinyl acetate, having an average macromolecular weight of from 8,000 to 12,000, and having a vinyl chloride content of from 80% to 90% by weight.

If colloidal, homogeneous solid dispersions of the vinyl resins and the plasticizers are to be prepared, the use of highly polymerized, insoluble polyvinyl halides, or of conjoint polymers of vinyl chloride with vinyl acetate having average macromolecular weights in excess of 12,000, and having vinyl chloride contents ranging from 85% to 95% by weight is desirable. Such dispersions are strong and resilient and provide highly serviceable substitutes for leather or for rubber and their durable characteristics qualify them for use in cable insulation. Such dispersions may be prepared by working an amount of the plasticizer from about 20% to about 50% by weight of the plastic composition with the resins on a heated rubber mill until a homogeneous colloidal dispersion is obtained.

As contrasted with known plasticizers, such as the lower aliphatic esters of derivatives of tetrahydrophthalic acid, the new esters, when incorporated in plastic compositions of the type just described, provide the advantages of greater strength at elevated temperatures and of greater flexibility at extremely low temperatures of around —15° C. This latter effect is unusual in view of the fact that long chain aliphatic radicals in chemical compounds normally tend to cause a very rapid increase in the consistency of the compound with decrease in temperature.

EXAMPLE 1.—*Di(2-ethylhexyl) endo-methylene hexahydrophthalate*

This ester was prepared by heating 900 grams of endo-methylene hexahydrophthalic anhydride with 1500 grams of 2-ethyl hexanol in the presence of 4 grams of sulfuric acid. The removal of water formed in the reaction was carried out by an azeotropic distillation in the presence of 200 cc. of toluene. The new ester was recovered as a water-white liquid having a boiling point of 212° C. at 2 mm. It possessed excellent qualities as a plasticizer as shown by the following example.

EXAMPLE 2.—*Plastic composition*

Sixty-eight (68) parts by weight of a conjoint polymer of vinyl chloride with vinyl acetate containing about 90% by weight vinyl chloride in the polymer and having an average molecular weight over 18,000 as determined by Staudinger's method, were combined with 32 parts by weight of di(2-ethyl hexyl) endo-methylene hexahydrophthalate. A plastic composition having excellent properties of strength, toughness and flexibility was obtained. Thus, its tensile strength at room temperature was 3490 pounds per square inch and its elongation before rupture was 300%. When 65 parts of highly polymerized polyvinyl chloride were combined with 35 parts by weight of the same saturated ester a plastic composition of similar properties was obtained. Thus, its tensile strength was 3040 pounds per square inch and its elongation before rupture was 190%.

I claim.

1. As new chemical compounds, diesters of endo-methylene hexahydrophthalic acids with aliphatic acyclic alcohols having at least six carbon atoms.

2. As new chemical compounds, diesters of endo-methylene hexahydrophthalic acid with liquid higher fatty alcohols having at least six carbon atoms.

3. Di(2-ethylhexyl) endo-methylene hexahydrophthalate.

CHARLES E. STAFF.

CERTIFICATE OF CORRECTION.

Patent No. 2,311,261. February 16, 1943.

CHARLES E. STAFF.

It is hereby certified that error appears in the printed specification of the above numbered patent requiring correction as follows: Page 2, second column, line 22, after "Di(2-ethylhexyl" insert a parenthesis; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.